US008199231B2

(12) United States Patent
Takamiya

(10) Patent No.: US 8,199,231 B2

(45) Date of Patent: Jun. 12, 2012

(54) IMAGE PICKUP ELEMENT UNIT WITH AN IMAGE PICKUP ELEMENT ON A SUBSTRATE FOR PICKING UP AN IMAGE AND AN OPTICAL LOW PASS FILTER SPACED FROM THE IMAGE PICKUP ELEMENT

(75) Inventor: Makoto Takamiya, Tokyo (JP)

(73) Assignee: Canon Kabushiki Kaisha (JP)

( * ) Notice: Subject to any disclaimer, the term of this patent is extended or adjusted under 35 U.S.C. 154(b) by 675 days.

(21) Appl. No.: 11/837,191

(22) Filed: Aug. 10, 2007

(65) Prior Publication Data

US 2008/0037125 A1 Feb. 14, 2008

(30) Foreign Application Priority Data

Aug. 10, 2006 (JP) ................................ 2006-218920

(51) Int. Cl.
*H04N 5/225* (2006.01)
*G02B 27/46* (2006.01)

(52) U.S. Cl. ......... 348/291; 348/342; 359/568; 359/569

(58) Field of Classification Search .................. 348/291, 348/335, 340, 342, 343, 344; 359/575
See application file for complete search history.

(56) References Cited

U.S. PATENT DOCUMENTS

| | | | | |
|---|---|---|---|---|
| 4,079,411 | A * | 3/1978 | Engelbrecht et al. | 396/305 |
| 4,277,138 | A * | 7/1981 | Dammann | 359/569 |
| 4,998,800 | A * | 3/1991 | Nishida et al. | 359/569 |
| 5,461,418 | A * | 10/1995 | Shiraishi | 348/291 |
| 6,560,018 | B1 * | 5/2003 | Swanson | 359/569 |
| 2002/0057358 | A1 * | 5/2002 | Kimura | 348/335 |
| 2005/0219700 | A1 * | 10/2005 | Ahn et al. | 359/566 |
| 2005/0264672 | A1 * | 12/2005 | Takahashi | 348/335 |
| 2006/0139476 | A1 * | 6/2006 | Sasaki | 348/342 |

FOREIGN PATENT DOCUMENTS

| | | | |
|---|---|---|---|
| JP | 01-254912 | A | 10/1989 |
| JP | 04-083222 | A | 3/1992 |
| JP | 05-307174 | A | 11/1993 |
| JP | 09-162112 | A | 6/1997 |
| JP | 2000-244799 | A | 9/2000 |

OTHER PUBLICATIONS

Japanese Office Action for corresponding JP 2006-218920, mail date Feb. 14, 2012.

* cited by examiner

*Primary Examiner* — David Ometz
*Assistant Examiner* — Dwight C Tejano
(74) *Attorney, Agent, or Firm* — Rossi, Kimms & McDowell LLP

(57) ABSTRACT

An image pickup apparatus which is capable of suppressing generation of shadows even when the aperture of the photographic lens is stopped down. A digital camera as an image pickup apparatus includes a photographic lens, a image pickup element that picks up an image of an object, and an optical low-pass filter disposed between the photographic lens and the image pickup element. The filter includes a liner phase diffraction grating having unit cells which are disposed in a regular pattern at a grating pitch P and are formed by equal-width recesses and equal-width protrusions adjacent to each other. When a shortest wavelength of a reference wavelength employed is λS, and a longest wavelength of the reference wavelength is λL, an optical path difference ΔH between lengths of optical paths of light of which a phase is varied by the phase grating is larger than λS/2 and smaller than λL/2.

5 Claims, 20 Drawing Sheets

FIG. 8A D=20μm
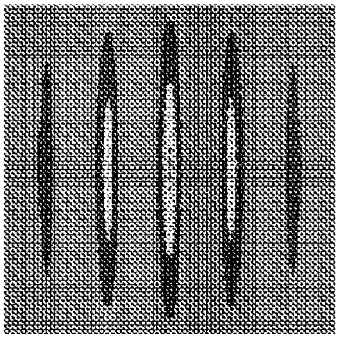
FIG. 8B D=25μm
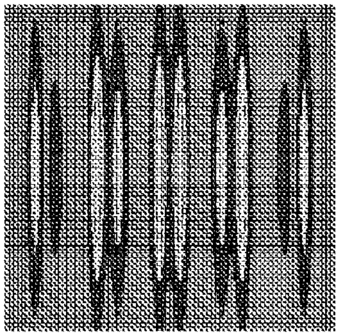
FIG. 8C D=30μm
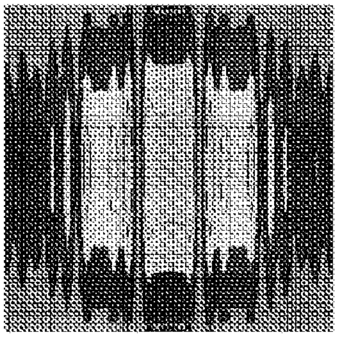
FIG. 8D D=35μm
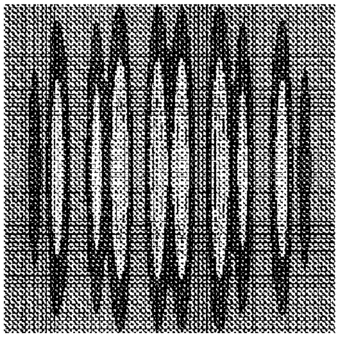
FIG. 8E D=40μm
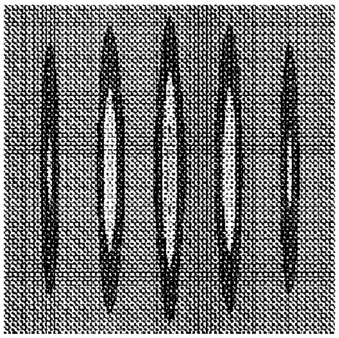

FIG. 16A D=20μm
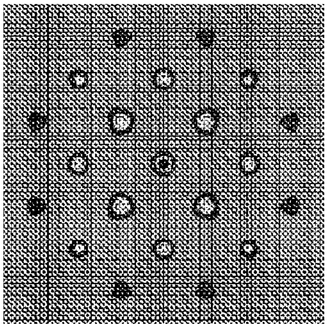
FIG. 16B D=25μm
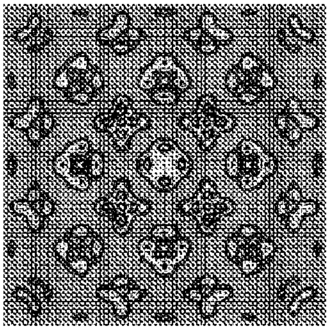
FIG. 16C D=30μm
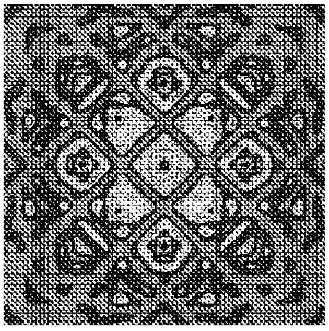
FIG. 16D D=35μm
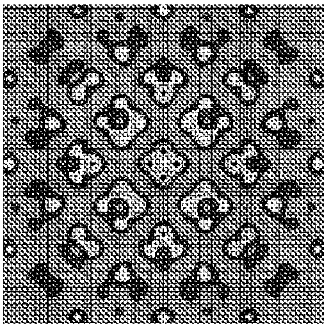
FIG. 16E D=40μm
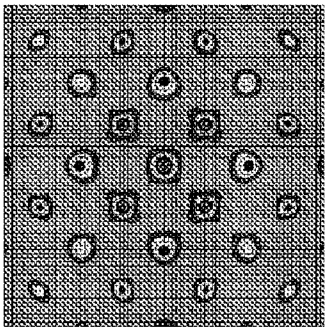

IMAGE PICKUP ELEMENT UNIT WITH AN IMAGE PICKUP ELEMENT ON A SUBSTRATE FOR PICKING UP AN IMAGE AND AN OPTICAL LOW PASS FILTER SPACED FROM THE IMAGE PICKUP ELEMENT

BACKGROUND OF THE INVENTION

1. Field of the Invention

The present invention relates to an image pickup apparatus, and more particularly to an image pickup apparatus equipped with a diffraction grating optical low-pass filter disposed between a photographic lens and an image pickup element.

2. Description of the Related Art

An image pickup apparatus, such as a video camera or a digital still camera, includes a photographic lens for receiving light incident from an object, an image pickup element for picking up an image of the object, and an optical low-pass filter disposed between the photographic lens and the image pickup element. The image pickup element is implemented by a single plate type image pickup tube or a solid-state image pickup element (CCD), for example.

To cut off high-frequency components contained in light from the object, the optical low-pass filter has a plurality of quartz crystals formed on a surface thereof toward an image forming surface of the image pickup element, such that the quartz crystals are arranged while varying optical axes thereof. This makes it possible to eliminate moire and false colors caused by a light pattern of the high-frequency components adversely affecting pixels of the image pickup element.

An example of the optical low-pass filter described above is one proposed in Japanese Laid-Open Patent Publication (Kokai) No. H01-254912 which includes a diffraction grating (hereinafter referred to as "the diffraction grating optical low-pass filter") (Pages 3 and 4, FIG. 1 of the publication). This optical low-pass filter includes no quartz crystals, since it includes the diffraction grating. Further, in the diffraction grating optical low-pass filter proposed in Japanese Laid-Open Patent Publication (Kokai) No. H01-254912, quadratic prism-shaped unit cells, which form the diffraction grating for use in the optical low-pass filter, are two-dimensionally arranged.

Further, Japanese Laid-Open Patent Publication (Kokai) No. H01-254912 discloses that intensities of luminance signals corresponding to optical images formed on a surface of the image pickup element are averaged by a pattern of the diffraction grating.

However, the above-described optical low-pass filter that includes quartz crystals has disadvantages in cost and space since the filter is required to have the plurality of quartz crystals arranged while varying optical axes thereof.

On the other hand, the diffraction grating optical low-pass filter is more inexpensive and advantageous in respect of required space than the optical low-pass filter including the quartz crystals, but it suffers from the problem that when the aperture of the photographic lens is stopped down, there is produced reflections (shadows) of optical images caused by the structural pattern of the diffraction grating. Particularly in an image pickup apparatus of a single-lens reflex type, which has to be configured such that various lenses can be exchanged, it is necessary to suppress occurrence of shadows from being caused even by a light flux formed by an aperture having an F-number of 16 or more, though such a light flux is not required by compact digital cameras.

Further, in the diffraction grating optical low-pass filter, the pattern of an optical image formed on the surface of the image pickup element changes intricately not only due to the structural pattern of the diffraction grating but also due to a gap (spacing) between the diffraction grating and the image pickup element. For example, even under general shooting conditions, an optical image sometimes has portions strong in light intensity, which are locally produced by a change in the pattern of the optical image. Furthermore, the image pickup element is not open to a full opening percentage of 100%, and hence it is difficult to average light amounts in the portions locally strong in light intensity. Therefore, when a light flux formed by an aperture having an F-number of 16 or more is incident, it is difficult to suppress occurrence of shadows generated by the light flux simply by using the diffraction grating.

SUMMARY OF THE INVENTION

The present invention provides an image pickup apparatus which is capable of suppressing generation of shadows even when the aperture of a photographic lens is stopped down.

In a first aspect of the present invention, there is provided an image pickup apparatus comprising a photographic lens configured to receive light incident thereon from an object, an image pickup element configured to pick up an image of the object, and an optical low-pass filter disposed between the photographic lens and the image pickup element, the optical low-pass filter including a phase grating having unit cells disposed in a regular pattern at a grating pitch P, the unit cells being formed by equal-width recesses and equal-width protrusions adjacent to each other, wherein when a shortest wavelength of a reference wavelength employed is $\lambda S$, and a longest wavelength of the reference wavelength is $\lambda L$, an optical path difference $\Delta H$ between lengths of optical paths of light of which a phase is varied by the phase grating is larger than $\lambda S/2$, and at the same time smaller than $\lambda L/2$.

With the arrangement of the first aspect of the present invention, it is possible to suppress generation of a shadow even when the aperture of the photographic lens is stopped down.

The optical low-pass filter and the image pickup element can be arranged such that a spacing D between the phase grating and the image pickup element satisfies a relationship of $P^2/4\lambda L<P^2/4\lambda S$.

The image pickup element is formed by a plurality of pixels arranged at a pixel pitch P', and an F-number of the photographic lens is larger than $3.2\times P'$.

The protrusions of the unit cells are elongated in shape.

The phase grating is formed by a staggered grating as a two-dimensional shape, in which the protrusions are formed by placing first and second unit cells elongated in shape, one upon the other.

The above and other objects, features, and advantages of the invention will become more apparent from the following detailed description taken in conjunction with the accompanying drawings.

BRIEF DESCRIPTION OF THE DRAWINGS

FIGS. 1A and 1B are schematic block diagrams of the internal arrangement of a digital camera as an image pickup apparatus according to a first embodiment of the present invention, in which FIG. 1A shows a case where F-number 2 is set, and FIG. 1B shows a case where F-number 3 is set.

FIGS. 3A and 3B are diagrams useful in explaining the appearance of the Optical low-pass filter 20 appearing in FIG. 2A, in which FIG. 3A is a side view of the optical low-pass filter, and FIG. 3B is a bottom view of the same.

FIGS. 8A to 8E are views showing the relationships between light intensities of optical images each formed on an image forming surface of a corresponding pixel of the image pickup element from a light flux having a light intensity distribution as shown in FIG. 7B and emitted from the linear phase diffraction grating, and spacing D.

FIGS. 12A and 12B are views showing the shape of a staggered phase grating formed by protrusions of a diffraction grating of an optical low-pass filter in FIG. 11, in which FIG. 12A is a perspective view of the staggered grating, and FIG. 12B is a schematic top view of a pattern of the protrusions forming the staggered grating.

FIGS. 16A to 16E are views showing the relationships between light intensities of optical images each formed on the image forming surface of a corresponding pixel of the image pickup element from a light flux having a light intensity distribution as shown in FIG. 15B and emitted from the linear phase diffraction grating, and spacing D.

DETAILED DESCRIPTION OF THE PREFERRED EMBODIMENTS

The present invention will now be described in detail below with reference to the accompanying drawings showing preferred embodiment thereof.

Figure 1A:
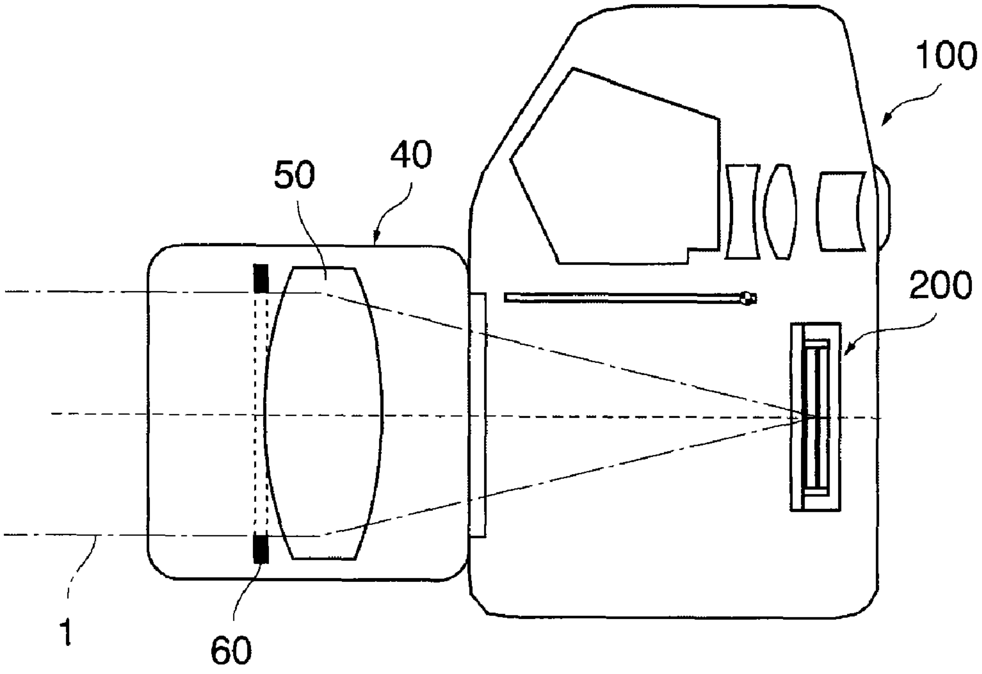
Figure 1B:
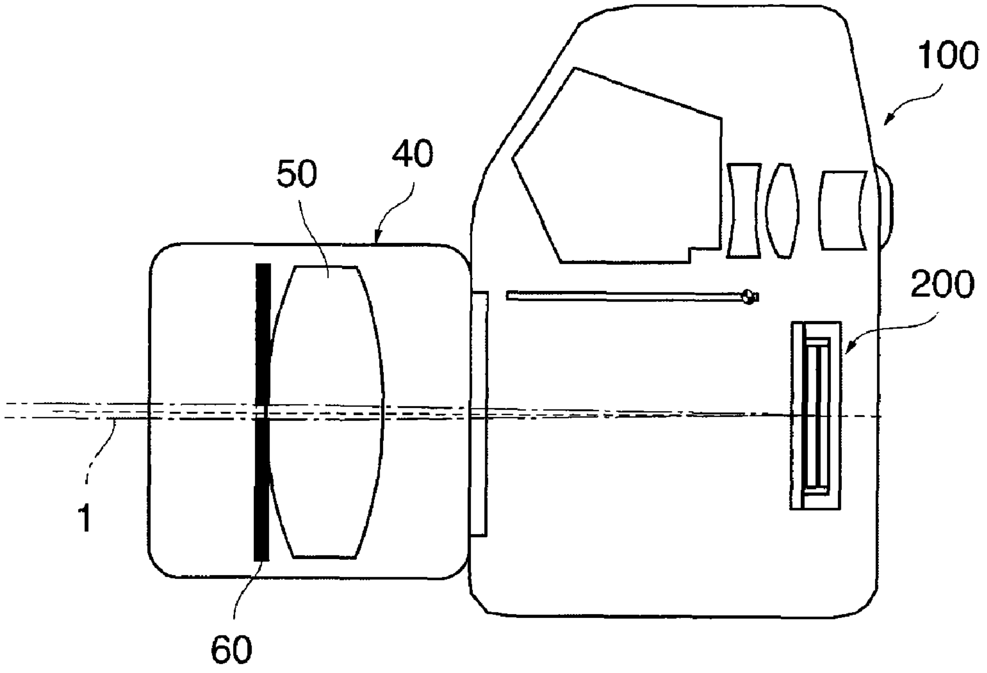

FIGS. 1A and 1B are schematic block diagrams of the internal arrangement of a digital camera as an image pickup apparatus according to a first embodiment of the present invention.

Referring to FIGS. 1A and 1B, the digital camera 100 is an image pickup apparatus of a single lens reflex type, which is comprised of a housing for containing an image pickup element unit 200, described hereinafter, and a photographic lens unit 40 exchangeably disposed in the housing.

The photographic lens unit 40 incorporates a photographic lens 50 for receiving light incident thereon from an object, and a diaphragm mechanism 60 for adjusting the diameter of an aperture of the photographic lens 50.

To adjust the aperture diameter of the photographic lens 50, an arbitrary aperture value (F-number) is set for the diaphragm mechanism 60. The diaphragm mechanism 60 is capable of adjusting the aperture diameter of the photographic lens 50, that is, the brightness of a light flux 1 entering the photographic lens 50 from the object. More specifically, FIG. 1A shows a bright light flux 1 obtained when the F-number of the diaphragm mechanism 60 is set to 2 (hereinafter described in such a manner as "F-number 2 is set", for example), and FIG. 1B shows a dark light flux 1 obtained when F-number 32 is set for the diaphragm mechanism 60.

Figure 2A:
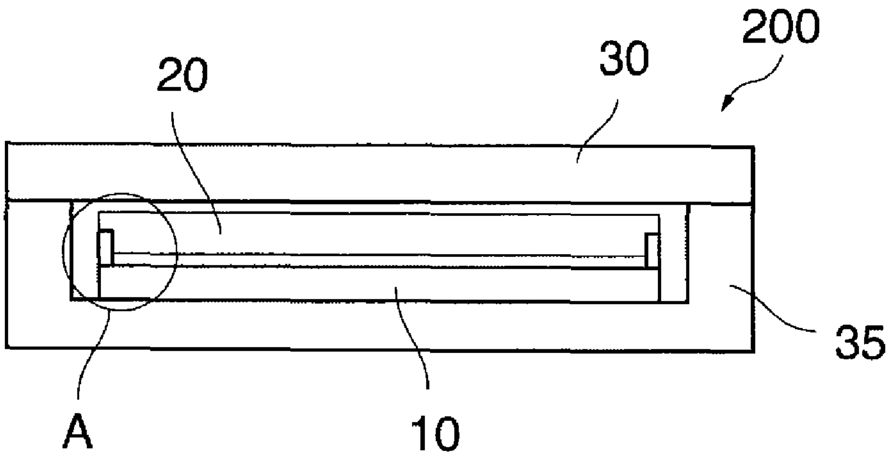
FIG. 2A is an enlarged views of an image pickup element unit 200 appearing in FIGS. 1A and 1B.
Figure 2B:
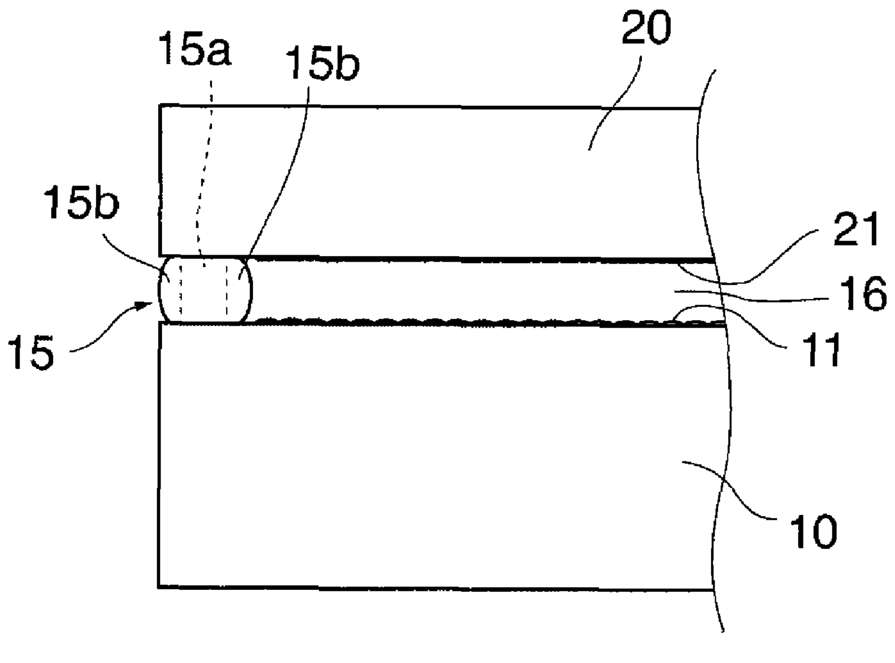
FIG. 2B is an enlarged view of a partial area A appearing in FIG. 2A.

FIG. 2A is an enlarged view of an image pickup element unit 200 appearing in FIGS. 1A and 1B, and FIG. 2B is an enlarged view of a partial area A appearing in FIG. 2A.

As shown in FIG. 2A, the image pickup element unit 200 is comprised of an image pickup element 10 for picking up an image according to an optical image of the object, an optical low-pass filter 20, a cover glass 30, and a ceramic package 35. The image pickup element 10 is a CMOS (Complimentary Metal Oxide Semiconductor) image pickup element which has color filters arranged in the Bayer array.

The cover glass 30 and the ceramic package 35 are arranged such that they hermetically seal the image pickup element 10 and the optical low-pass filter 20. This makes it possible to improve the environmental resistance of the image pickup element 10.

Further, the cover glass 30 is formed of a material functioning as an IR cut filter for cutting infrared rays. This makes it possible to extract light in a visible region efficiently from the light flux 1.

As shown in FIG. 2B, between the image pickup element 10 and the optical low-pass filter 20 which are opposed to each other, a holding portion 15 is disposed for holding peripheral portions of the image pickup element 10 and the optical low-pass filter 20. The holding portion 15 is comprised of a spacer 15*a*, and ultraviolet-curing UV adhesives 15*b* and 15*b*. After the UV adhesives 15*b* and 15*b* bond the image pickup element 10, the spacer 15*a*, and the optical low-pass filter 20 to each other, they are cured by irradiation of ultraviolet rays, thereby hermetically joining the members 10, 15*a*, and 20 to each other.

As a result, the image pickup element 10, the optical low-pass filter 20, and the holding portion 15 define an air gap 16 which determines spacing (indicated by D in FIG. 5, referred to hereinafter) between the image pickup element 10 and the optical low-pass filter 20.

Figure 3A:
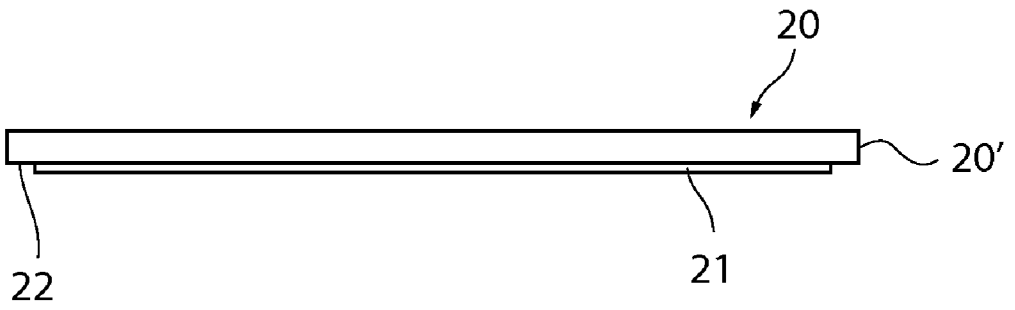
Figure 3B:
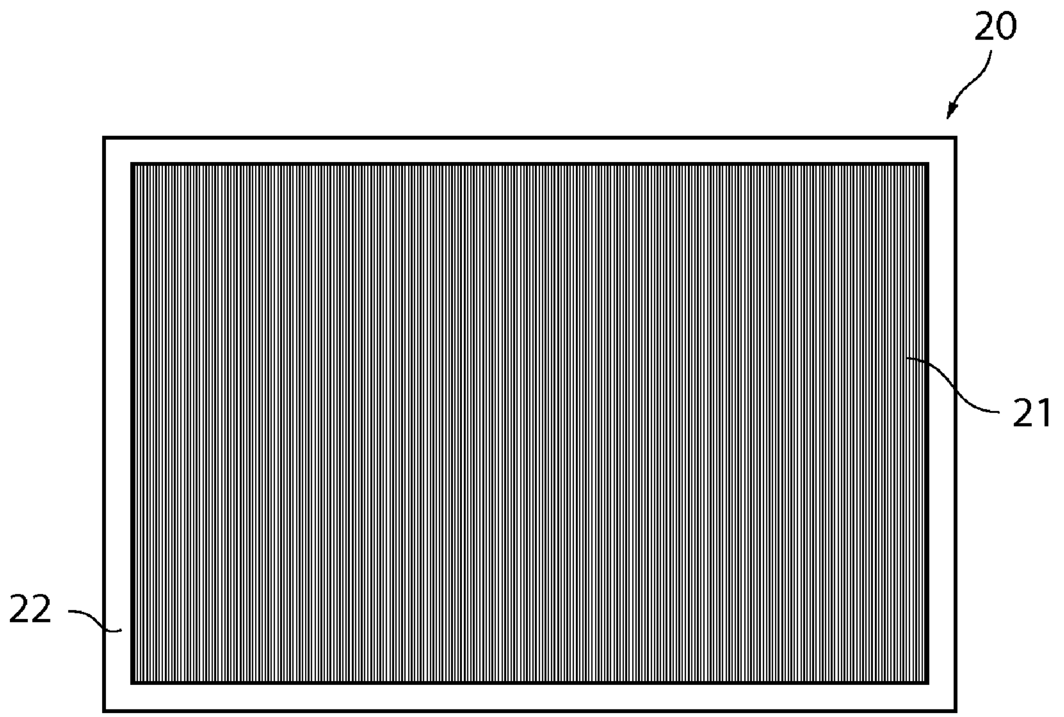

FIGS. 3A and 3B are diagrams useful in explaining the appearance of the Optical low-pass filter 20 appearing in FIG. 2A, in which FIG. 3A is a side view of the optical low-pass filter 20, and FIG. 38 is a bottom view of the same.

The optical low-pass filter 20 is comprised of a quartz substrate 20', and a diffraction grating 21 made of an organic material subjected to a photolithography process. Referring to FIG. 3A, the optical low-pass filter 20 has a flat surface on the top of the quartz substrate 20'. Further, the optical low-pass filter 20 includes the diffraction grating 21 formed on the lower surface of the quartz substrate 20'. The diffraction grating 21 is formed by a phase grating comprised of a plurality of unit cells disposed in a regular pattern at a grating pitch P, described hereinafter. It should be noted that the term "phase grating" means a diffraction grating having a characteristic of varying the phase of incident light.

Further, as shown in FIG. 3B, a gap holding bonding area 22 for disposing the holding portion 15 appearing in FIG. 2B thereon is provided on the lower surface of the quartz substrate 20' of the optical low-pass filter 20. The bonding area 22 has a width of e.g. 0.5 mm. The surface of the diffraction grating 21 appearing in FIG. 3B forms a light-effective area from which the light flux 1 incident on the optical low-pass filter 20 is emitted toward the image pickup element 10.

Figure 4:
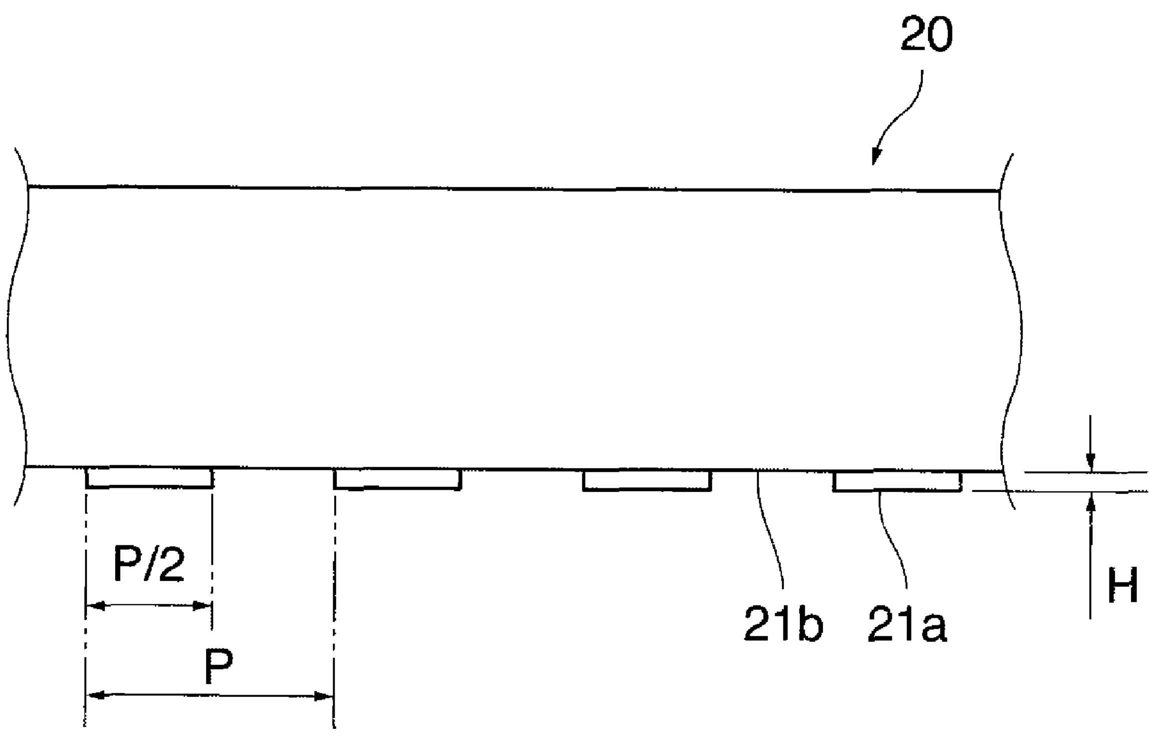
FIG. 4 is an enlarged view of the optical low-pass filter appearing in FIG. 3A.

FIG. 4 is an enlarged view of the optical low-pass filter 20 shown in FIG. 3A.

Referring to FIG. 4, the diffraction grating 21 of the optical low-pass filter 20 is formed by equal-width elongated protrusions 21*a* (protruding streaks) as unit cells which are formed at the same pitch, and equal-width recesses 21*b* are formed between the protrusions 21*a*. It should be noted that the recesses 21*b* define the height of the protrusions 21*a*, and hence they can be regarded as part of the diffraction grating.

The grating pitch P defining spacing between the protrusions 21*a* is 8.06 ($=5.7\times\sqrt{2}$) μm. Therefore, the protrusions 21*a* and the recesses 21*b* are formed at a half of the grating pitch P, i.e. at a pitch of P/2.

The protrusions 21*a* are formed by performing the photolithography process on an organic material having a refractive index (n) of 1.6 and formed on the quartz substrate. After the photolithography process, quartz forming a base part of the optical low-pass filter 20 is exposed in the recesses 21*b*.

Further, the height of the protrusions 21*a*, that is, the height H of the grating indicated in FIG. 4 is 0.45 μm, for example. The grating height H is calculated as follows:

First, in the present invention, the optical path difference ΔH between the lengths of optical paths of incident light the phase of which is varied by the diffraction grating 21 is defined by the following equations:

$$\Delta H = H\times(n-1) \tag{1}$$

$$\Delta H = \lambda/2 \tag{2}$$

In the equation (2), λ represents a reference wavelength of e.g. 540 nm. Therefore, when the reference wavelength λ (=540 nm) and the refractive index n (=1.6) are substituted into the equations (1) and (2), the value (nm) of the grating height H can be calculated by the equation (1).

Figure 5:
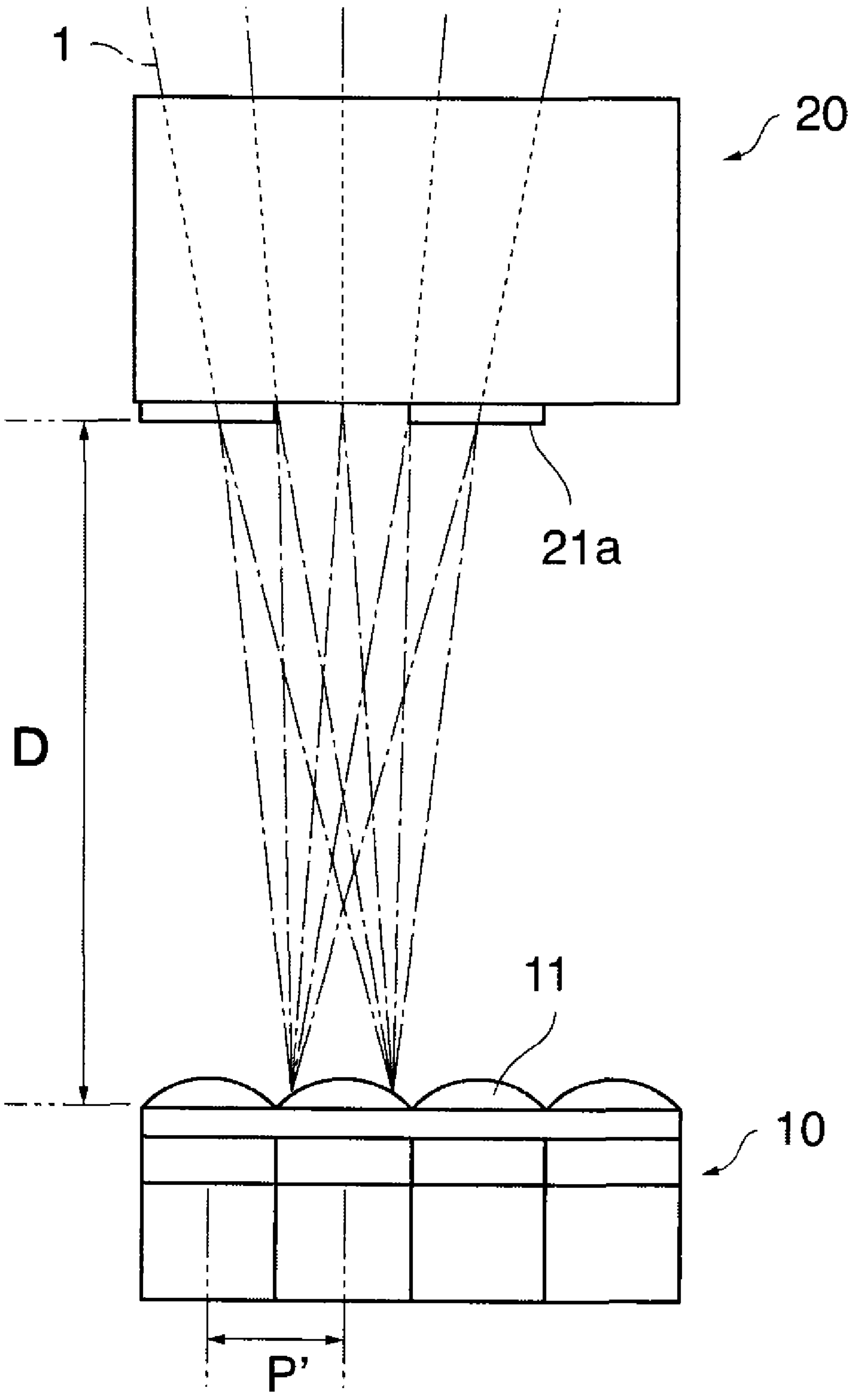
FIG. 5 is a diagram useful in explaining the positional relationship between the optical low-pass filter and the image pickup element in FIG. 2A.

FIG. 5 is a diagram useful in explaining the positional relationship between the optical low-pass filter 20 and the image pickup element 10 shown in FIG. 2A.

As shown in FIG. 5, the spacing D defining the distance between the image pickup element 10 and the optical low-pass filter 20 is 30 μm, for example.

Further, as shown in FIG. 5, micro lenses 11 each having a predetermined opening are arranged on upper surfaces of respective pixels of the image pickup element 10. Out of the light flux 1, each micro lens 11 guides light having passed through the opening thereof to a light receiving surface, i.e. an image forming surface of each pixel, whereby optical images corresponding to the light flux 1 are formed on the image forming surfaces of the pixels. Thus, the image pickup element 10 samples the amount and intensity of light guided to each pixel, for obtaining image data of the light.

In FIG. 5, a pixel pitch P' defining the distance between the pixels of the image pickup element 10 is e.g. 5.7 μm.

Now, in general, a Nyquist frequency Ns ($\mu m^{-1}$) corresponding to a half of the sampling frequency can be calculated when the value of the pixel pitch P' of the image pickup element 10 is substituted into the following equation (3):

$$Ns = 1000/(2\times P') \tag{3}$$

By the way, a condensed state of the light flux 1 which is condensed by the photographic lens 50 at an image forming position can be handled as a pattern formed by a plurality of concentric rings, that is, an airy disk pattern, from a viewpoint of wave optics. When an MTF (Modulation Transfer Function) characteristic is considered, it is necessary to analyze how line images are distributed.

Figure 19:
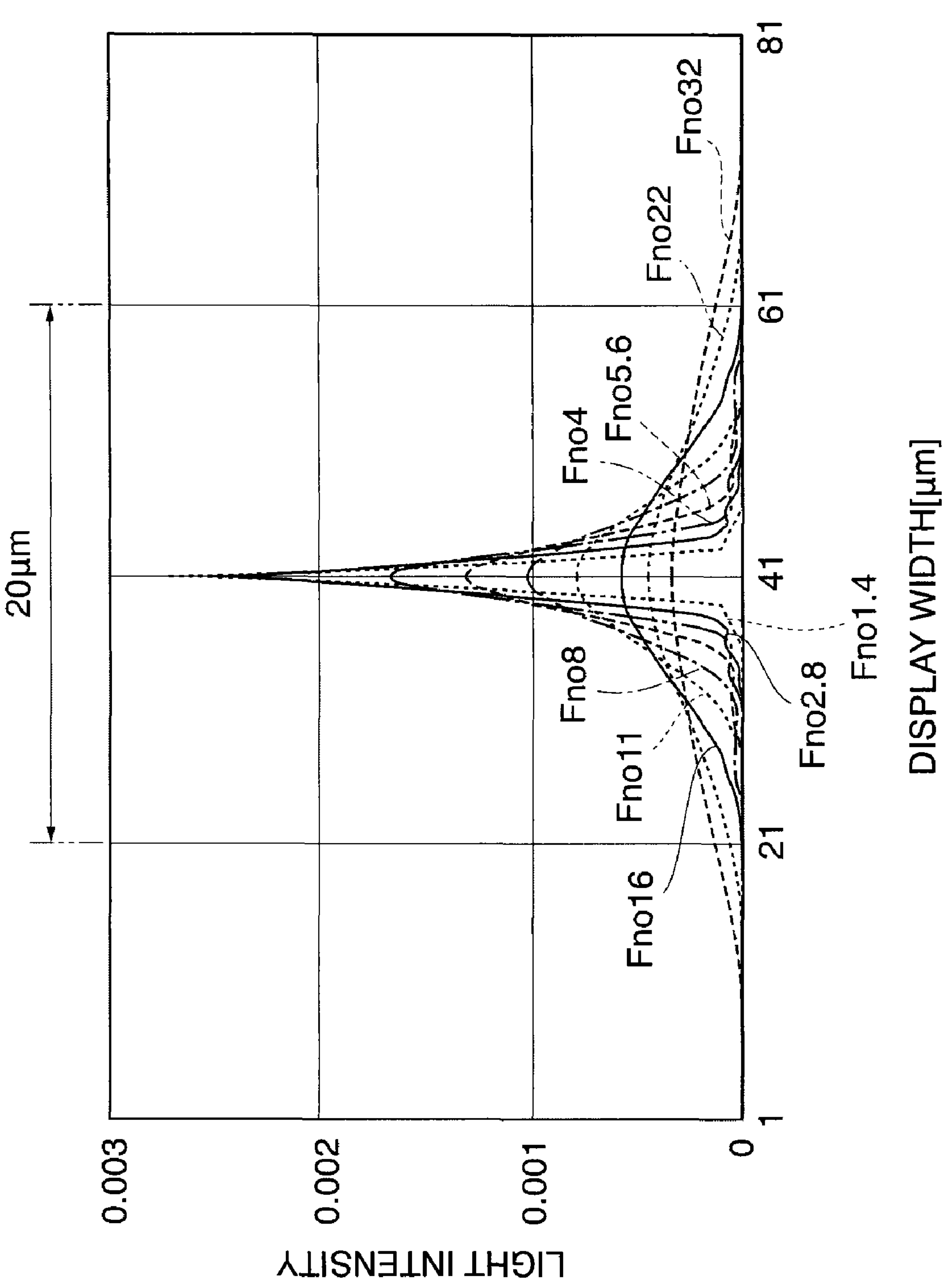
FIG. 19 is a graph showing the relationship between a line image distribution and the F-number.
Figure 20:
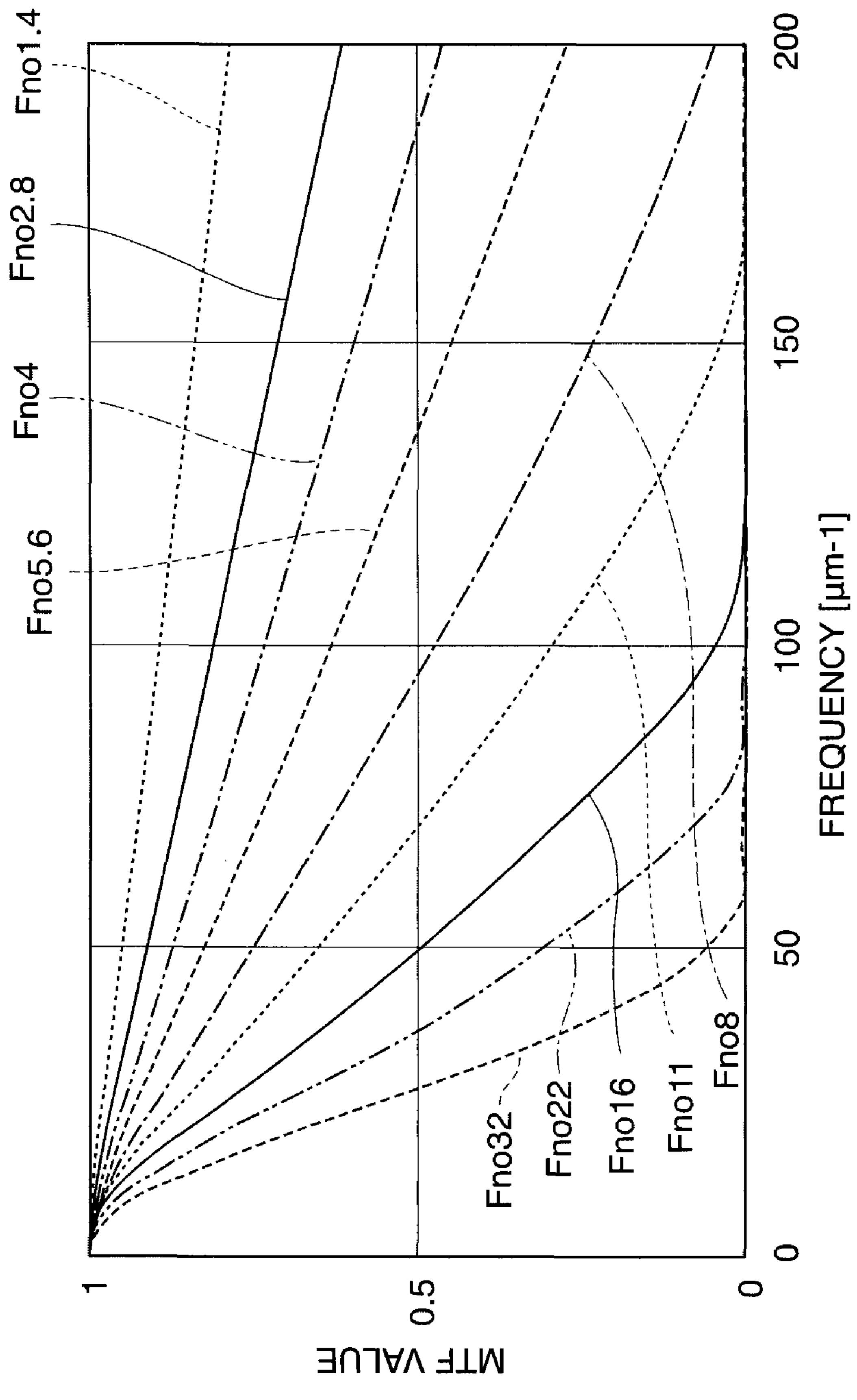
FIG. 20 is a graph showing an MTF characteristic calculated with reference to FIG. 19.

FIG. 19 shows results of calculations of how line images are distributed, based on the airy disk pattern at a wavelength of 550 nm, in which the relationship between the line image distribution and the F-number is illustrated. By analyzing frequencies with reference to FIG. 19, an MTF characteristic is calculated as shown in FIG. 20. It is understood from FIG. 20 that there is a correlation between an MTF value indicative of the MTF characteristic of the photographic lens 50 in an ideal optical system, and the F-number.

Roughly, the value ($\mu m^{-1}$) of a frequency M0 can be calculated by substituting a aperture value (F-number) into the following equation (4). For example, in the case of F-number 32 or F-number 16, if it is multiplied by the frequency M0 that limits the MTF value within a range of 0 to 0.1, approximately 1600 $\mu m^{-1}$ is given.

$$Mo = 1600/F\text{-number} \tag{4}$$

Therefore, from the equations (3) and (4), it is possible to dispense with optical low-pass filters including the optical low-pass filter 20, within a range of aperture values (F-numbers) set such that the value of the Nyquist frequency Ns becomes larger than the value of the frequency M0 (Ns>M0). More specifically, for a range of F-numbers shown in the following expression (5), the optical low-pass filters can be dispensed with.

$$F\text{-number} > 3.2\times P' \tag{5}$$

Insofar as the value of the pixel pitch P' is 5.7 μm in the equation (5), there is no need to dispose an optical low-pass filter when the aperture value (F-number) is larger than 18. Accordingly, when the aperture value (F-number) is within the above range, the low-pass function for filtering the light flux 1 by the optical diffraction is unnecessary, which makes it possible to give priority to suppressing generation of shadows in the image pickup element 10.

Figure 6C:
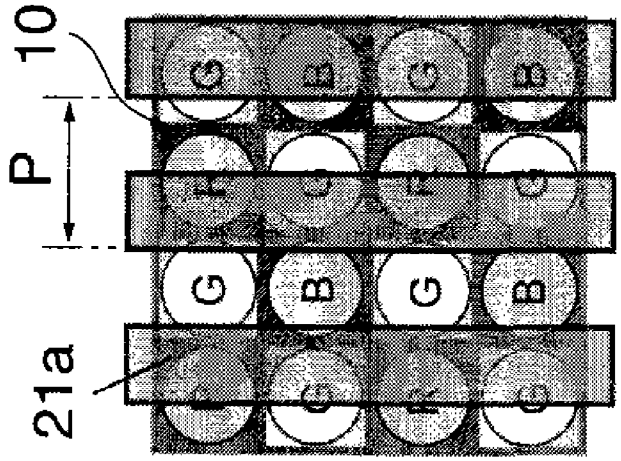
FIGS. 6A to 6C are top views of the image pickup element, as viewed from a diffraction grating appearing in FIG. 5, in respective states in which protrusions of the diffraction grating are laterally displaced with respect to the image pickup element.
Figure 6B:
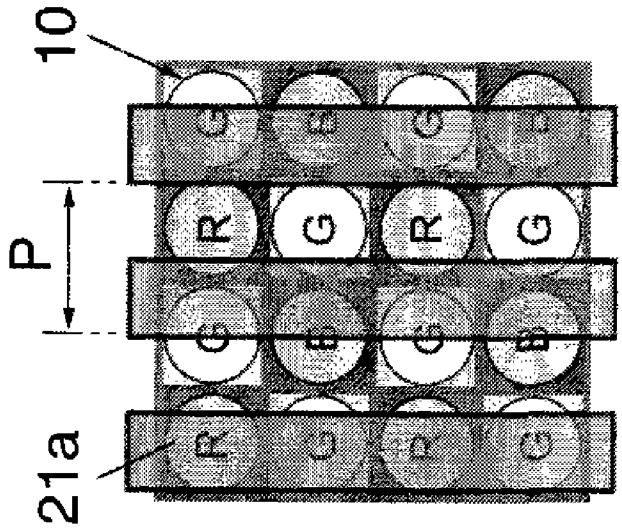
Figure 6A:
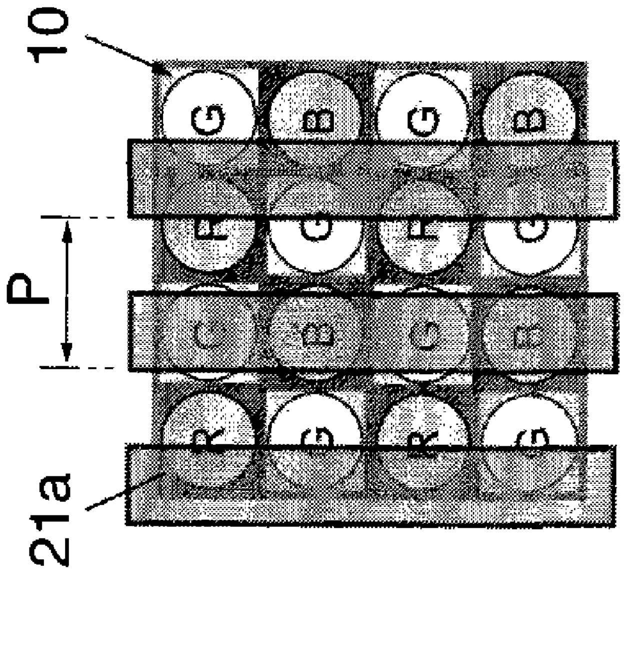

FIGS. 6A to 6C are top views of the image pickup element 10, as viewed from the diffraction grating 21 in FIG. 5, in respective states in which the protrusions 21*a* of the diffraction grating 21 are laterally displaced with respect to the image pickup element 10.

As shown in FIGS. 6A to 6C, the respective positions of the protrusions 21*a* of the diffraction grating 21 are laterally displaced e.g. by several tens of μm with respect to the corresponding positions of the pixels laid out in the image pickup element 10. From a process point of view, it is difficult to position two members which are in the positional relationship laterally displaced relative to each other as described above. Further, also when the light flux 1 having passed through the photographic lens 50 is obliquely incident on the image pickup element 10, there occurs substantial displacement in lateral relative positional relationship between the diffraction grating 21 and the image pickup element 10.

From the above, it is necessary to prevent variation in the sampling of the amount and intensity of an optical image performed via each pixel of the image pickup element 10 from being caused when the aperture of the diaphragm mechanism 60 has a small diameter, even in the case of occurrence of the relative positional displacement as shown in FIGS. 6A to 6C.

Now, a description will be given of a case where the grating pitch P of the diffraction grating 21 (hereinafter referred to as "the linear phase diffraction grating 21", as deemed appropriate) is 8.06 μm, and the reference wavelength λ in use is 540 nm. When these values are substituted into the following equation (6), it is possible to calculate 30.08 μm as a value of the spacing D indicated in FIG. 5.

$$D=P^2/4\lambda \tag{6}$$

It should be noted that in the equation (6), the spacing D is only required to satisfy the relationship of $P^2/4\lambda L<D<P^2/4\lambda S$, wherein λS represents the shortest wavelength of the reference wavelength λ, and λL represents the longest wavelength of the same.

Figure 7A:
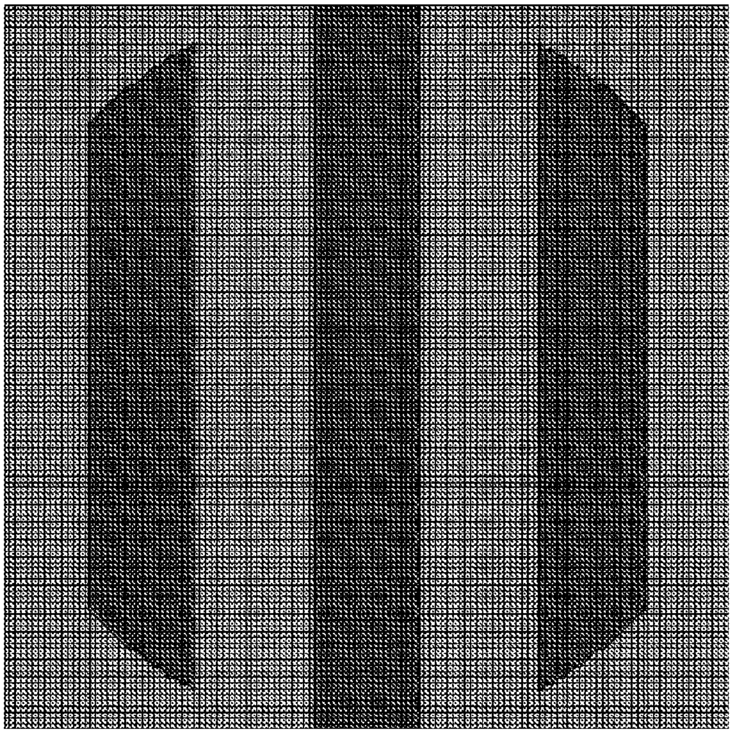
FIG. 7A is a view showing an example of the shape of an image of light emitted from a linear phase diffraction grating on which a parallel light flux is incident.
Figure 7B:
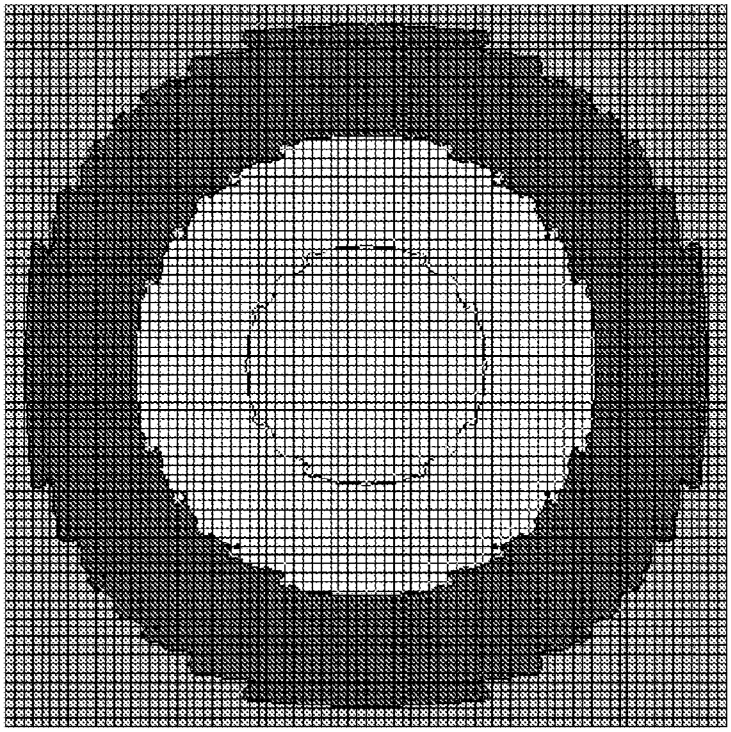
FIG. 7B is a schematic view showing an example of light intensities of portions of the optical image shown in FIG. 7A.

FIG. 7A is a view showing an example of the shape of an image (optical image) of light emitted from the linear phase diffraction grating 21 on which a parallel light flux is incident. and FIG. 7B is a schematic view showing an example of light intensities of the optical image shown in FIG. 7A. Further, FIGS. 8A to 8E are views showing the relationships between light intensities of optical images each formed on an image forming surface of a corresponding pixel of the image pickup element from a light flux having a light intensity distribution as shown in FIG. 7B and emitted from the linear phase diffraction grating, and spacing D.

It should be noted that the light intensities of the optical images shown in FIG. 7A to FIG. 8E are determined as the results of calculations based on wave simulations. In the wave simulations, to suppress ringing (waving) of light intensities due to small-diameter openings, the intensities of the light flux 1 incident on the linear phase diffraction grating 21 are caused to have a Gaussian distribution.

The optical image shown in FIG. 7B causes light interference during passing through the air gap 16 having the spacing D, to thereby form the optical images as shown in FIGS. 8A to 8E.

As shown in FIG. 8C, when the value of the spacing D is 30 μm, which is closest to the value of 30.08 μm calculated by the equation (6), the light intensity distribution, except at the boundaries of the diffraction grating 21, has substantially the same characteristic as that of a light intensity distribution in a state where the diffraction grating 21 is not provided. On the other hand, as shown in FIGS. 8B, 8D, 8A, and 8E, interference fringes are locally generated in the optical images as the value of the spacing D further deviates from the value of 30.08 μm calculated by the equation (6).

The light intensity distributions shown in FIGS. 8A to 8E are obtained assuming the light flux shown in FIG. 7B as an illuminated light flux. Actually, each illustrated light intensity distribution is obtained by superposing optical images formed respectively from the illuminated light flux in FIG. 7B and illuminated light fluxes laterally displaced therefrom. Therefore, the distribution of light intensities obtained when the value of the spacing D is close to 30 μm becomes substantially flat, except at the boundaries of the diffraction grating 21.

This makes it possible to make substantially flat the light intensities of respective portions of an image formed on the image forming surface of the image pickup element 10, i.e. the light intensities of optical images formed on the light receiving surfaces associated with the respective pixels of the image pickup element 10, on a pixel-by-pixel basis, by receiving light through the micro lenses 11 on the image pickup element 10.

Further, as shown in FIGS. 6A to 6C, in the case where the relative positional relationship between the image pickup element 10 and the diffraction grating 21 is displaced in the lateral direction, even when the aperture has a small diameter, e.g. when F-number 32 is set (see FIG. 1B), the distribution of the light intensities of respective portions of an optical image formed by the incident light flux 1 becomes flat except at the boundaries of the linear phase diffraction grating 21.

Figure 9:
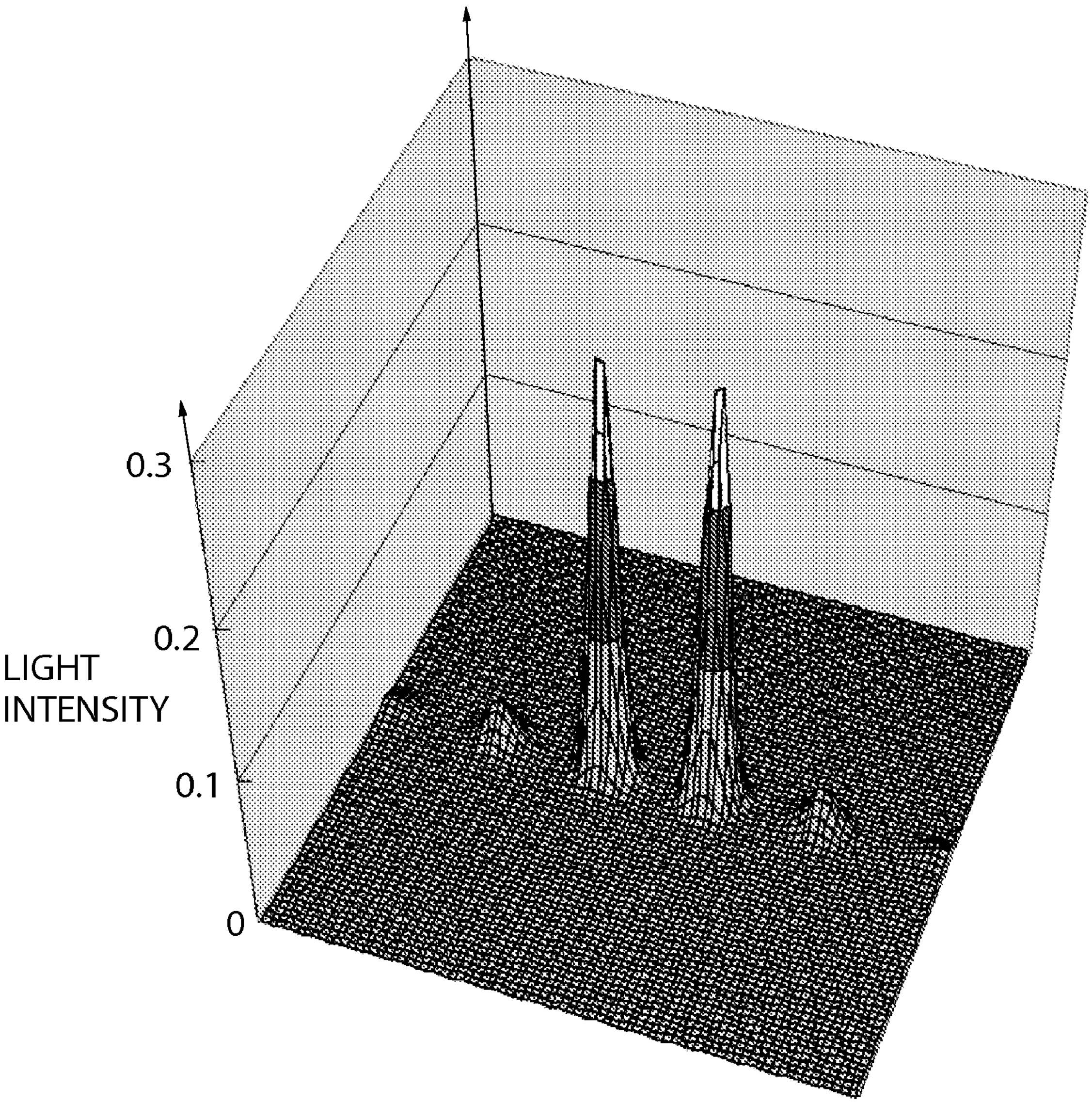
FIG. 9 is a view showing the result of wave analysis performed as to how a point image is separated when F-number 2 is set as in FIG. 1A.

FIG. 9 is a view showing the result of wave analysis of how a point image is separated when F-number 2 is set as in FIG. 1A.

It is understood from FIG. 9 that the effect of the low-pass filter (low-pass effect) is also obtained even when the aperture has a large diameter, e.g. when F-number 2 is set.

Figure 10:
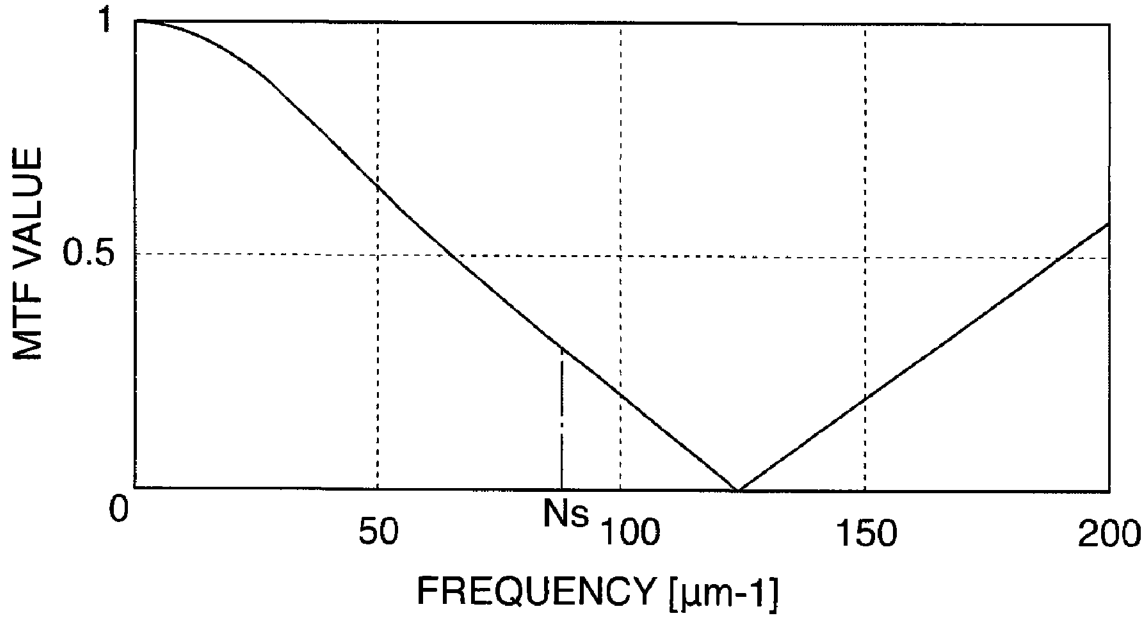
FIG. 10 is a graph showing an MTF characteristic concerning image separation in a horizontal direction, exhibited when the Optical low-pass filter appearing in FIG. 2A is employed.

FIG. 10 is a graph showing the MTF characteristic concerning image separation in a horizontal direction, exhibited when the optical low-pass filter 20 in FIG. 2A is employed.

It is understood from the MTF characteristic shown in FIG. 10 that although the effect of suppressing false colors in a horizontal direction and a diagonal direction is conspicuous, the effect of suppressing false colors in a vertical direction is inconspicuous. This makes it possible to effectively suppress false colors with a good balance between suppression of false colors and the sense of resolution, by taking into account opposite characteristics of false colors and the perceived resolution in which the more suppressed the false colors are, the lower the perceived resolution is, in view of the quality of a photographed image. More specifically, the above-described embodiment shows an example in which to attach importance to the perceived resolution, that is the height of resolution, an optical low-pass filter only in one axial direction is employed.

It should be noted that although in the present embodiment, the optical low-pass effect is caused to be given in the horizontal direction, this is not limitative, but it is also possible to cause the optical low-pass effect in the vertical direction to be given by rotating the arrangement of the protrusions 21*a* and the recesses 21*b* of the diffraction grating 21 through 90 degrees.

As described in detail heretofore, according to the first embodiment of the present invention, by employing a one-dimensional diffraction grating, i.e. the linear phase diffraction grating 21, it is possible to suppress generation of shadows even when the aperture of the photographic lens 50 is stopped down.

Next, a second embodiment of the present invention will be described. An image pickup apparatus according to the present embodiment has the same configuration as that of the digital camera 100 as the image pickup apparatus according to the first embodiment. Therefore, in the following, component elements of the image pickup apparatus according to the present embodiment identical to those of the digital camera 100 are designated by identical reference numerals, and description thereof is omitted.

Figure 11:
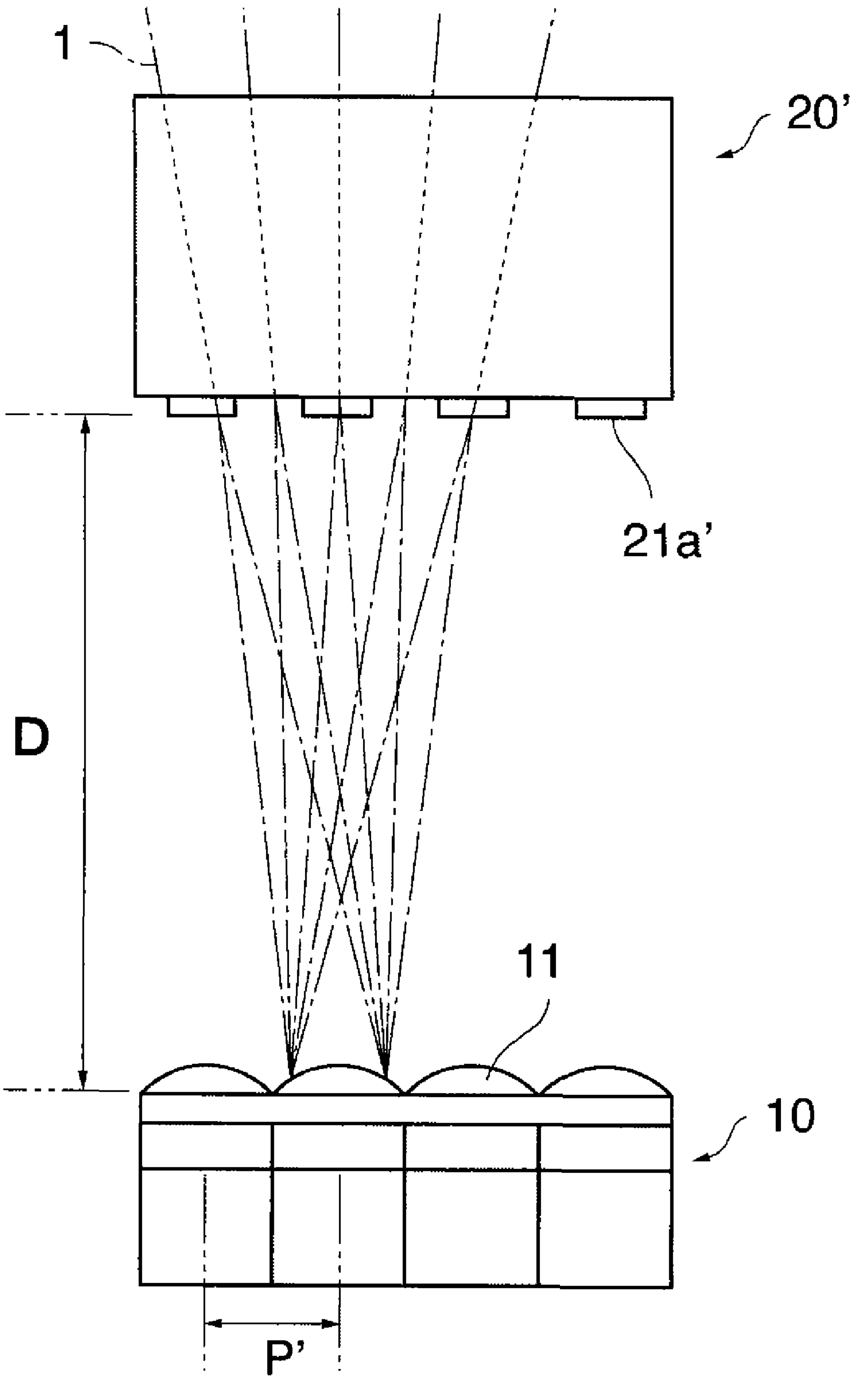
FIG. 11 is a view showing the positional relationship between a diffraction grating optical low-pass filter and an image pickup element of the image pickup apparatus according to a second embodiment of the present invention.

FIG. 11 is a view showing the positional relationship between a diffraction grating optical low-pass filter and an image pickup element of the image pickup apparatus according to the second embodiment.

As shown in FIG. 11, the value of the spacing D between the image pickup element 10 and the optical low-pass filter 20' is 30 μm, and the pixel pitch P' of the image pickup element 10 is 5.7 μm.

Further, micro lenses 11 each having a predetermined opening are arranged on upper surfaces of respective pixels of the image pickup element 10. Each micro lens 11 guides light of the light flux 1, having passed through the opening thereof, to a light receiving surface, i.e. an image forming surface of each pixel, whereby an optical image corresponding to the light flux 1 is formed on the image forming surface of each pixel. Thus, the image pickup element 10 samples the amount and the intensity of light guided to each pixel, i.e. obtains image data.

Figure 12A:
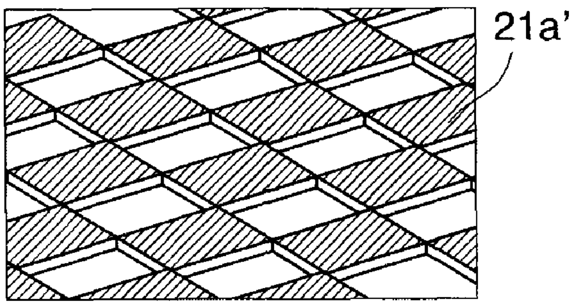
Figure 12B:
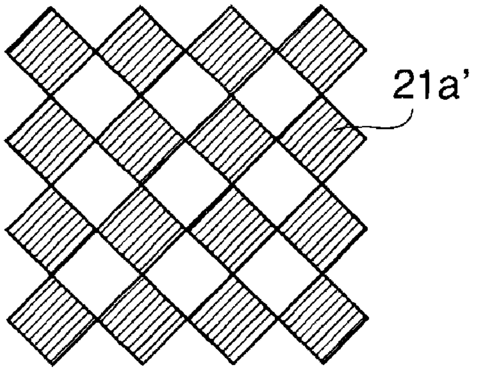

FIGS. 12A and 12B are views showing the shape of a staggered phase grating formed by protrusions 21*a*' of a diffraction grating 21' of the optical low-pass filter 20' in FIG. 11. It should be noted that FIG. 12A is a perspective view of the staggered grating, and FIG. 12B is a schematic top view of a pattern of the protrusions 21*a*' forming the staggered grating.

FIGS. 13A to 13E are diagrams useful in explaining the construction of the staggered phase grating shown in FIG. 12B.

Figure 13A:
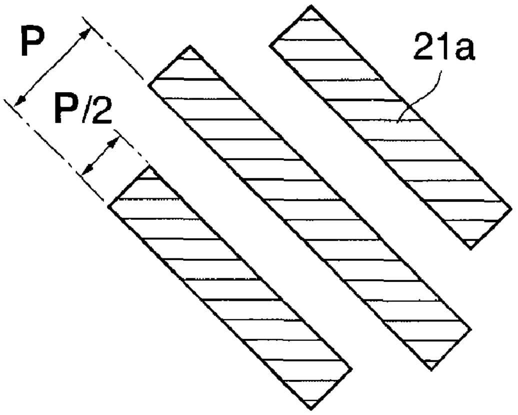
FIGS. 13A to 13E are diagrams useful in explaining the construction of the FIG. 12B staggered phase grating.
Figure 13B:
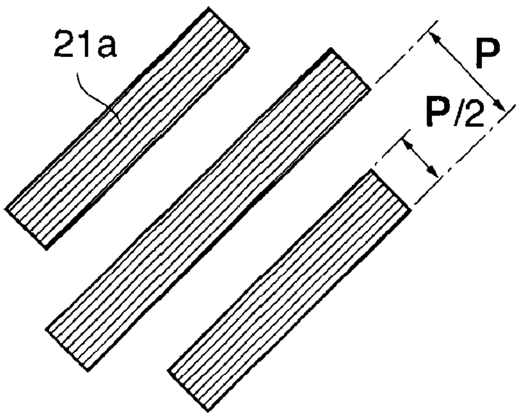

FIG. 13A shows a diffraction grating formed by rotating the protrusions 21*a* of the linear phase diffraction grating 21 shown in FIG. 6A counterclockwise through 45 degrees, and FIG. 13B shows a diffraction grating formed by rotating the protrusions 21*a* of the linear phase diffraction grating 21 shown in FIG. 6A clockwise through 45 degrees.

Figure 13C:
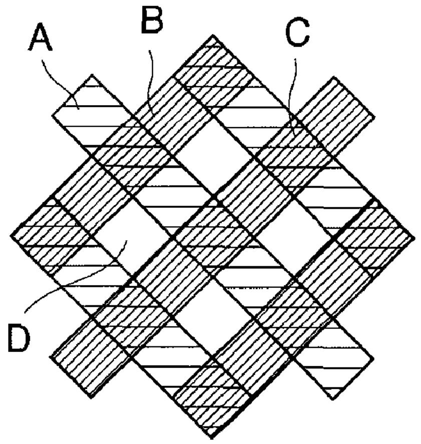

FIG. 13C is a schematic view of a staggered phase grating formed by placing the protrusions 21*a* of the linear phase diffraction gratings 21 shown in FIGS. 13A and 13B, one upon the other. Referring to FIG. 13C, in areas A and B where the protrusions 21*a* do not overlap each other, the grating height is not changed, and hence a phase height AH thereof is also one time as large as that of the linear phase diffraction grating 21 in FIG. 6A. Further, in areas C where the protrusions 21*a* overlap each other, the grating height becomes two times as large as that of the linear phase diffraction grating 21, and hence the phase height ΔH thereof also becomes two times as large as that of the linear phase diffraction grating 21 in FIG. 6A (i.e. 2×ΔH). It should be noted that in areas D where the recesses 21*b* overlap each other, the grating height is 0.

Now, since the phase height ΔH is equal to λ/2 as expressed by the equation (2), the phase height in the areas C where the protrusions 21*a* overlap each other is equal to λ. Therefore, from the phase point of view, it is understood that no phase displacement occurs in the areas C.

Figure 13D:
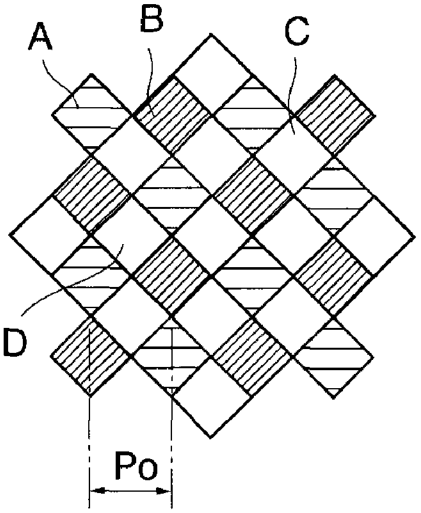

FIG. 13D is a schematic view useful in explaining the phase height of the staggered grating shown in FIG. 13C. As shown in FIG. 13D, the phase height becomes equal to 0 in the areas C where the protrusions 21*a* overlap each other.

Figure 13E:
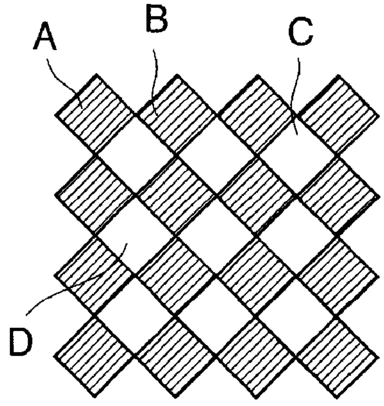

FIG. 13E is a schematic view of a staggered grating in which areas having the same phase height in the staggered grating shown in FIG. 13D, that is, the areas A and B are patterned. It is understood that the pattern shown in FIG. 13E is the same as that of the staggered grating shown in FIG. 12B.

At this time, a pitch $P_0$ in each of longitudinal and transverse directions between adjacent ones of the unit cells forming the staggered grating is 5.7 μm, which is equal to the value of the pixel pitch p'.

Figure 14A:
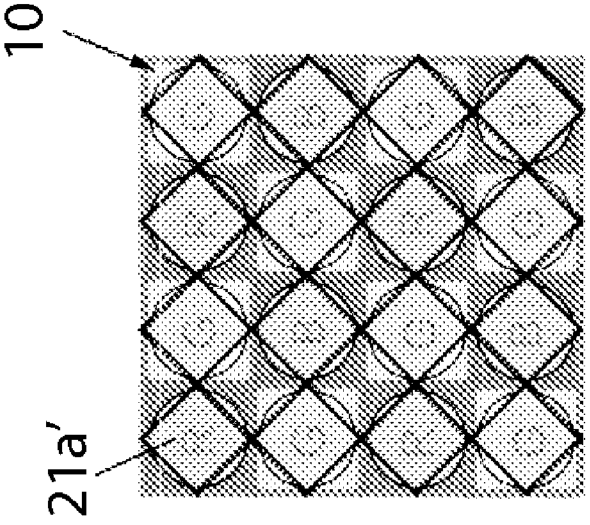
FIGS. 14A to 14C are top views of the image pickup element, as viewed from the diffraction grating in FIG. 11, in respective states in which protrusions of the diffraction grating are laterally displaced with respect to the image pickup element.
Figure 14B:
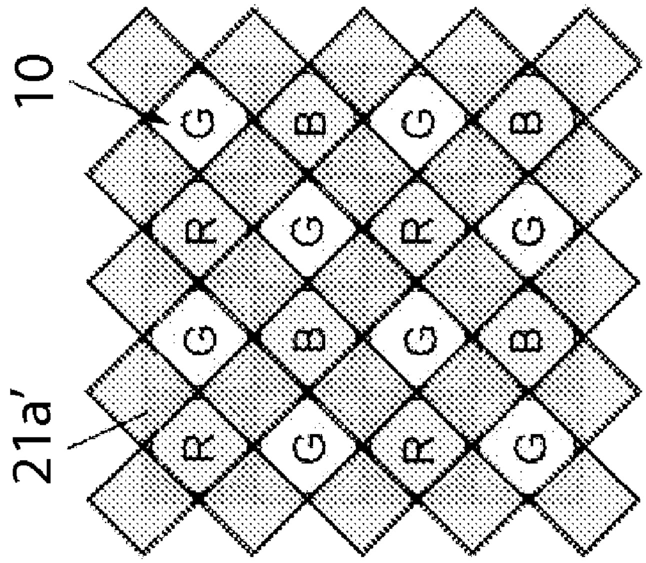
Figure 14C:
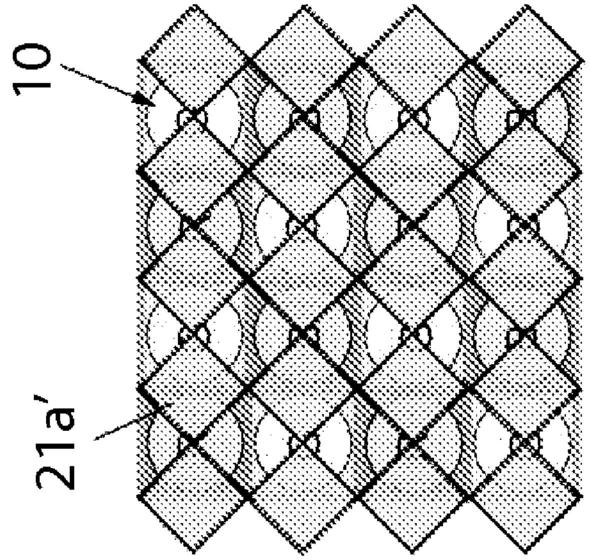

FIGS. 14A to 14C are top views of the image pickup element 10, as viewed from the diffraction grating 21' in FIG. 11, in respective states in which protrusions 21*a*' of the diffraction grating 21' are laterally displaced with respect to the image pickup element.

As shown in FIGS. 14A to 14C, also when relative positional displacement occurs, similarly to the case described above with reference to FIGS. 6A to 6C, it is necessary to it is necessary to prevent variation in the sampling of the amount and intensity of an optical image performed via each pixel of the image pickup element 10 from being caused when the aperture of the diaphragm mechanism 60 has a small diameter, even in the case of occurrence of the relative positional displacement.

Figure 15A:
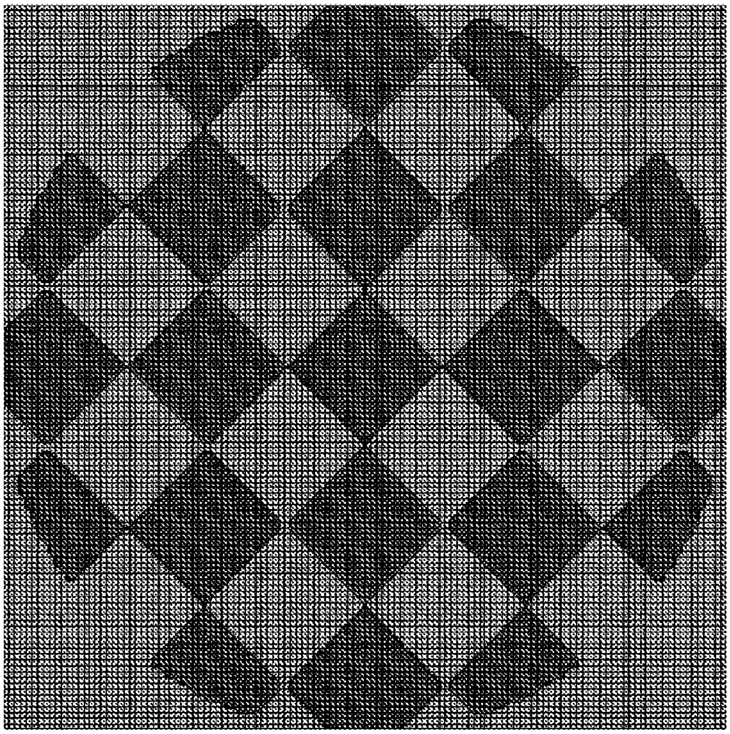
FIG. 15A is a view showing an example of the shape of an image of light emitted from the phase diffraction grating on which a parallel light flux is incident.
Figure 15B:
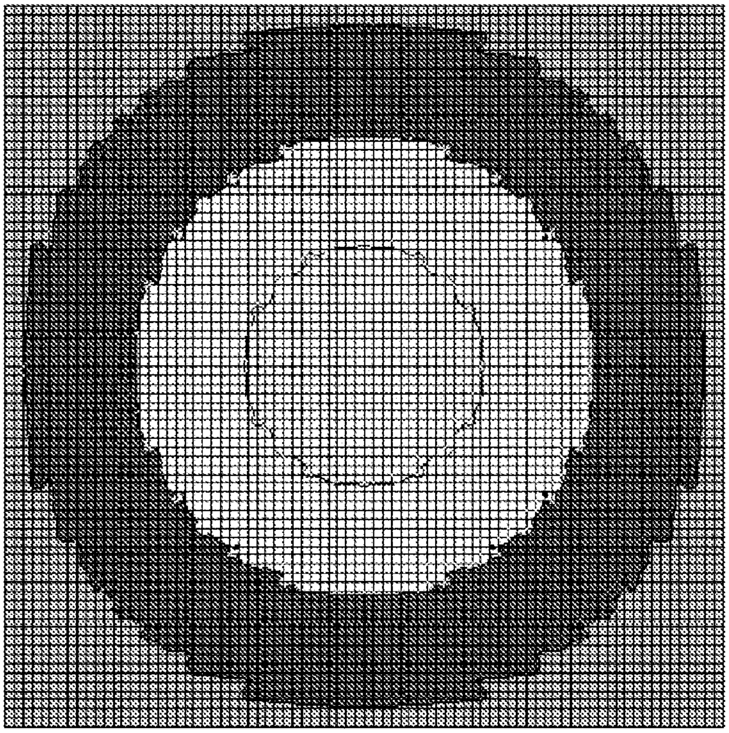
FIG. 15B is a schematic view showing an example of light intensities of portions of the optical image shown in FIG. 15A.

FIG. 15A is a view showing an example of the shape of an image of light emitted from the phase diffraction grating on which a parallel light flux is incident, and FIG. 15B is a schematic view showing an example of light intensities of portions of the optical image shown in FIG. 15A. Further, FIGS. 16A to 16E are views showing the relationships between light intensities of optical images each formed on an image forming surface of a corresponding pixel of the image pickup element from a light flux having a light intensity distribution as shown in FIG. 15B and emitted from the linear phase diffraction grating 21', and spacing D.

It should be noted that the light intensities of the optical images shown in FIG. 15A to FIG. 16E are determined as the results of calculations based on wave simulations. In the wave simulations, to suppress ringing (waving) of light intensities due to small-diameter openings, the intensities of the light flux 1 incident on the linear phase diffraction grating 21' are caused to have a Gaussian distribution.

As shown in FIG. 15A, the shape of the image (optical image) of light emitted from the staggered phase grating 21' is the same as the shape of the staggered grating formed by placing the protrusions formed by rotating the protrusions 21*a* of the linear phase diffraction grating 21 having a grating pitch P of 8.06 μm clockwise and counterclockwise through 45 degrees, one upon the other, as described above with reference to FIG. 13C.

Therefore, it is understood that the description as to the protrusions 21*a* of the linear phase diffraction grating 21 in the first embodiment also applies to the staggered phase grating 21'. More specifically, as is apparent from FIGS. 16A to 16E, the value of the spacing D which prevents interference fringes (diffraction images) from being locally generated by diffraction of light is identified to be approximately 30 μm, which is indicated in FIG. 16C.

The light intensity distributions shown in FIGS. 16A to 16E are obtained assuming the light flux shown in FIG. 15B as an illuminated light flux. Actually, each illustrated light intensity distribution is obtained by superposing optical images formed respectively from the illuminated light flux in FIG. 15B and illuminated light fluxes laterally displaced therefrom. Therefore, the distribution of light intensities obtained when the value of the spacing D is close to 30 μm becomes substantially flat, except at the boundaries of the diffraction grating 21'.

Figure 17:
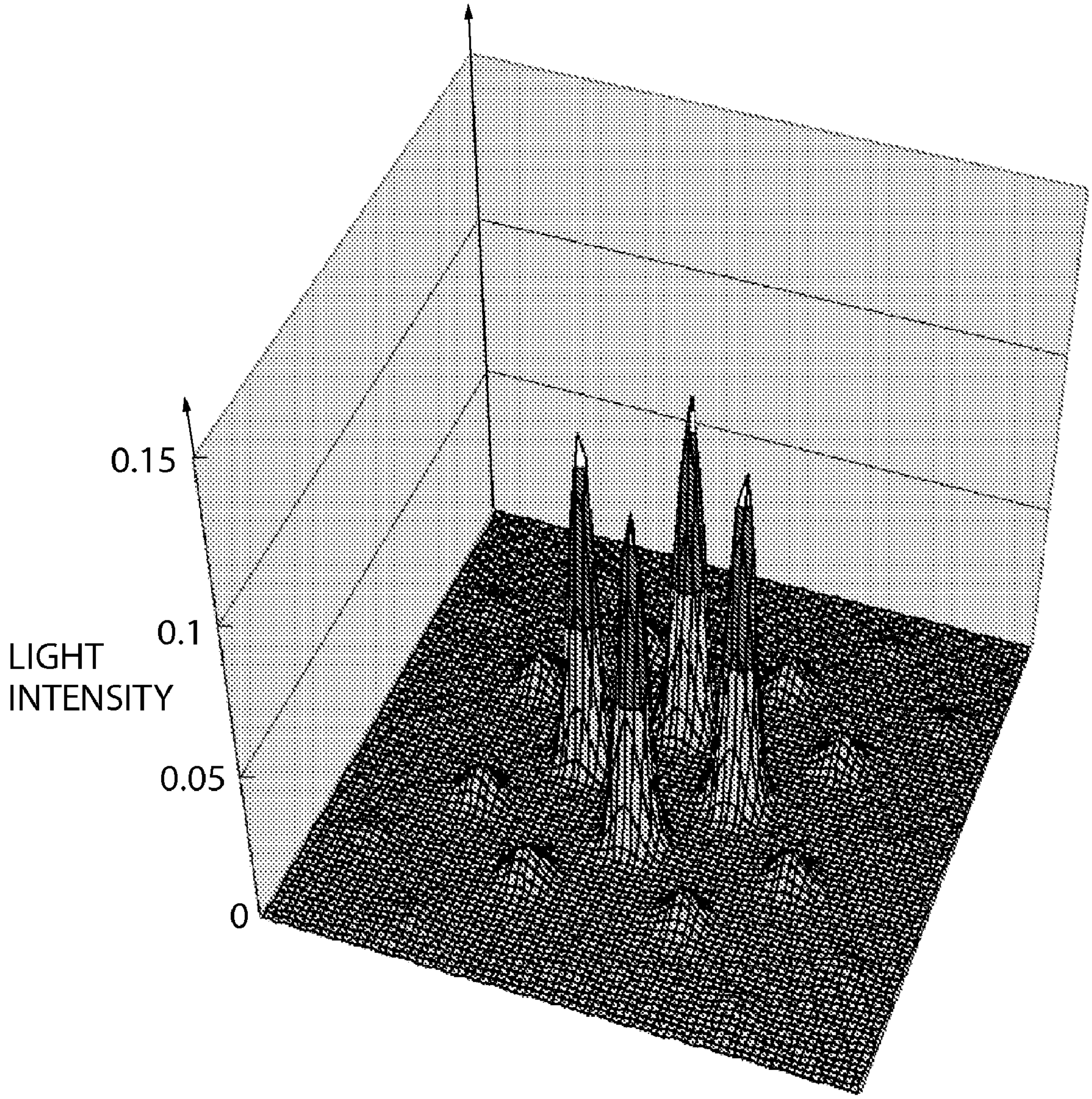
FIG. 17 is a view showing the result of wave analysis as to how a point image is separated when F-number 2 is set as in FIG. 1A.

FIG. 17 is a view showing the result of wave analysis as to how a point image is separated when F-number 2 is set as in FIG. 1A.

It is understood from FIG. 17 that the low-pass effect is obtained also when the aperture has a large diameter, e.g. when the F-number is 2.

Figure 18A:
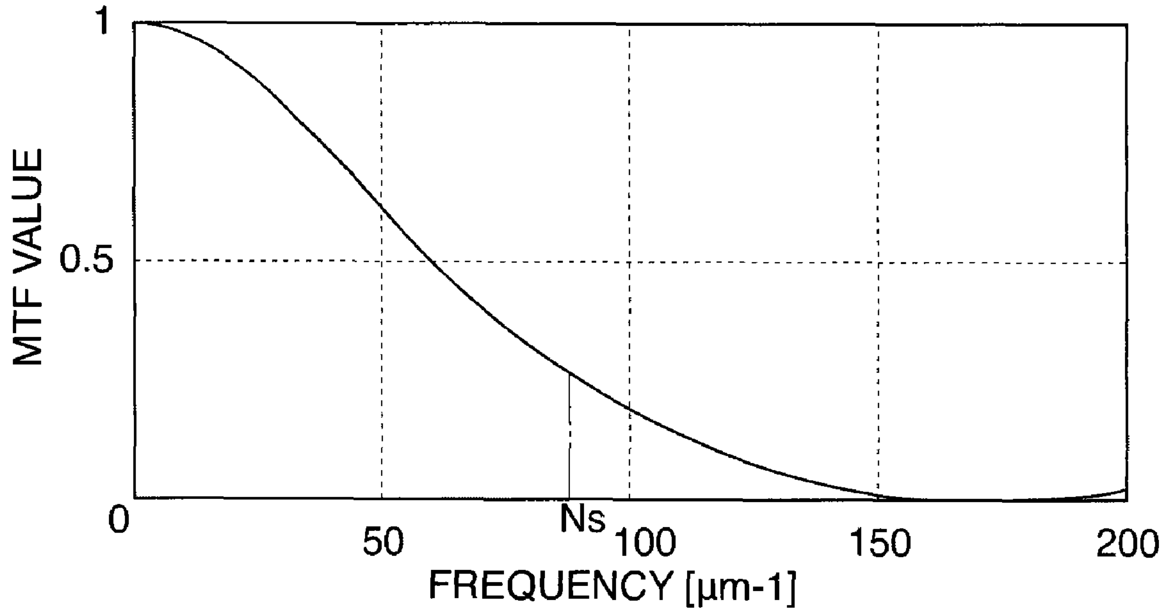
FIG. 18A is a view showing an MTF characteristic concerning image separation in a horizontal direction and a vertical direction.
Figure 18B:
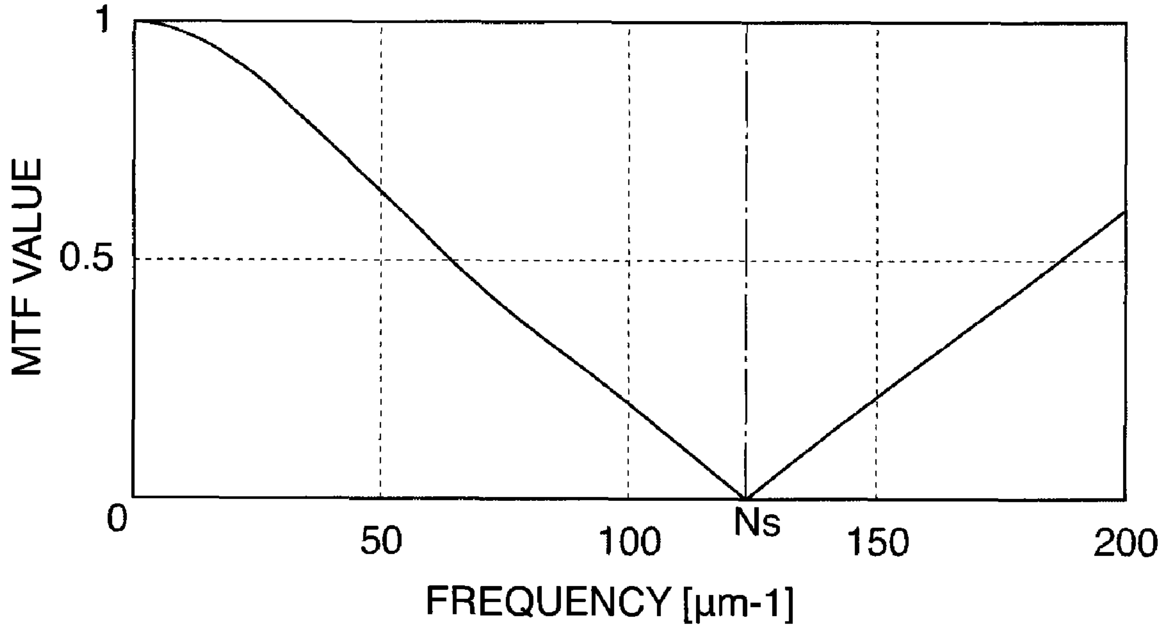
FIG. 18B is a view showing an MTF characteristic concerning image separation in a diagonal direction.

FIG. 18A is a graph showing an MTF characteristic concerning image separation in a horizontal direction and a vertical direction, exhibited when the optical low-pass filter 20' appearing in FIG. 11 is employed, and FIG. 18B is a graph showing an MTF characteristic concerning image separation in a diagonal direction, exhibited when the optical low-pass filter 20' appearing in FIG. 11 is employed.

It is understood from the MTF characteristic shown in FIG. 18A that although the effect of suppressing false colors in the horizontal and diagonal directions is conspicuous, the effect of suppressing false colors in the vertical direction is inconspicuous. Further, it is understood from the MTF characteristic shown in FIG. 18B that the effect of suppressing false colors is substantially coincident with the Nyquist frequency Ns particularly in the diagonal direction, and hence it is possible to positively eliminate the false colors in the diagonal direction. This makes it possible to effectively suppress false colors with a good balance between suppression of false colors and the sense of resolution, by taking into account opposite characteristics of false colors and the perceived resolution in which the more suppressed the false colors are, the lower the perceived resolution is, in view of the quality of a photographed image.

Although in the above-described second embodiment, the value of the pitch $P_0$ in the longitudinal and transverse directions between adjacent ones of the unit cells forming the staggered grating is made equal to the value of the pixel pitch P', the value of the pitch $P_0$ in the longitudinal and transverse directions may not be equal to the value of the pixel pitch P'.

As described in detail hereinbefore, according to the second embodiment of the present invention, by employing a two-dimensional diffraction grating, i.e. the phase diffraction grating 21', it is possible to suppress generation of shadows even when the aperture of the photographic lens 50 is stopped down.

Although in the first and second embodiments, the present invention is applied to the image pickup apparatus, this is not limitative, but the present invention can be applied to any apparatus insofar as it forms an optical image on a predetermined surface thereof.

Further, although in the above-described embodiments, the spacing D is only required to satisfy the relationship of $P^2/4\lambda L<D<P^2/4\lambda S$, this is not limitative, but it is possible to modify this relationship to the relationship of $2\times(\lambda S\times D)^{1/2}<P<2\times(\lambda S\times D)^{1/2}$.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2006-218920 filed Aug. 10, 2006, which is hereby incorporated by reference herein in its entirety.

What is claimed is:

1. An image pickup element unit comprising:

a substrate;

an image pickup element arranged on said substrate and configured to pick up an object image and output an electric signal corresponding to the object image; and an optical low-pass filter disposed between a photographic lens and said image pickup element, said optical low-pass filter including a phase grating having unit cells disposed in a regular pattern at a grating pitch P, said unit cells being formed by equal-width recesses and equal-width protrusions adjacent to each other;

a spacer disposed between said image pickup element and said optical low-pass filter and configured to keep a predetermined spacing D therebetween; and a cover glass arranged to hermetically seal said image pickup element and said optical low-pass filter in association with said substrate, wherein when a shortest wavelength of light employed is λS, and a longest wavelength of light employed is λL, an optical path difference ΔH between lengths of optical paths of the shortest wavelength of light and the longest wavelength of light of which a phase is varied by said phase grating, is larger than λS/2, and at the same time smaller than λL/2, and wherein said optical low-pass filter and said image pickup element are arranged such that the predetermined spacing D between said phase grating and said image pickup element satisfies the relationship $P^2/4\lambda L<P^2/4\lambda S$.

2. An image pickup element unit according to claim 1, wherein:

said image pickup element is formed by a plurality of pixels arranged at a pixel pitch P', and an F-number of said photographic lens is larger than 3.2× P'.

3. An image pickup element unit according to claim 1, wherein said protrusions of said unit cells are elongated in shape.

4. An image pickup element unit according to claim 3, wherein:

said image pickup element is formed by a plurality of pixels arranged at a pixel pitch P', and an F-number of said photographic lens is larger than 3.2× P'.

5. An image pickup element unit according to claim 1, wherein said phase grating is formed by a staggered grating as a two-dimensional shape, in which said protrusions are formed by placing first and second unit cells elongated in shape, one upon the other.

* * * * *